United States Patent [19]
Pollak et al.

[11] Patent Number: 4,658,681
[45] Date of Patent: Apr. 21, 1987

[54] PORTABLE LATHE

[75] Inventors: Henry Pollak, Royersford; Gordon Wells, Spring City, both of Pa.

[73] Assignee: American Machine and Tool Co., Royersford, Pa.

[21] Appl. No.: 786,439

[22] Filed: Oct. 11, 1985

[51] Int. Cl.[4] .................. B23B 17/00; B23B 19/00; B23B 23/00; B23B 3/02

[52] U.S. Cl. .................................. 82/6 R; 82/4 R; 82/28 R; 82/31; 82/32

[58] Field of Search ............... 82/4 R, 6 R, 28 R, 31, 82/32

[56] References Cited

U.S. PATENT DOCUMENTS

| | | | |
|---|---|---|---|
| 135,064 | 1/1873 | Barnes | 82/28 R |
| 419,155 | 1/1890 | McDaniel | 82/28 R |
| 1,666,484 | 4/1928 | Bouillon | 82/31 |
| 1,966,409 | 7/1934 | Hoelscher | 82/31 |
| 2,243,588 | 5/1941 | Wahnish | 82/31 |
| 2,391,154 | 12/1945 | Groene | 82/31 |
| 3,376,769 | 4/1968 | Garvin | 82/31 |
| 3,600,988 | 8/1971 | Davis | 82/31 |
| 4,186,630 | 2/1980 | Lindhag | 82/4 R |
| 4,455,900 | 6/1984 | Callanan et al. | 82/4 A |
| 4,538,488 | 9/1985 | Arvai | 82/32 |

Primary Examiner—Nicholas P. Godici
Assistant Examiner—Jerry Kearns

[57] ABSTRACT

A portable lathe includes a bed, a removable headstock and a removable slidable fixable tailstock. The bed has a horizontal plane surface and a vertical plane surface at one end thereof. The horizontal surface has a central longitudinal guide way therethrough. The vertical surface has a plurality of bed holes horizontally disposed therethrough. The headstock has a plurality of first headstock holes horizontally disposed therethrough. The first headstock holes are equal in number to and aligned with the bed holes. The headstock has a plurality of second headstock holes horizontally disposed therethrough. A second headstock hole is adjacent each first headstock hole. A push bolt is associated with each first headstock hole, and the free end of the push bolt bears on the vertical surface. A pull bolt is associated with each second headstock hole and bed hole. The tailstock includes a locking mechanism and an alignment mechanism. The locking mechanism includes a locking plate, a cam wedge, a cam lock arm, and a nut, all of which are disposed on a bolt which vertically extends through the base of the tailstock. The arm is movable between two positions, a lock position and an unlocked position. The alignment mechanism is a guide bar which is an oblong member, is freely slidable in the guide way and is attached to a base of the tailstock.

13 Claims, 7 Drawing Figures

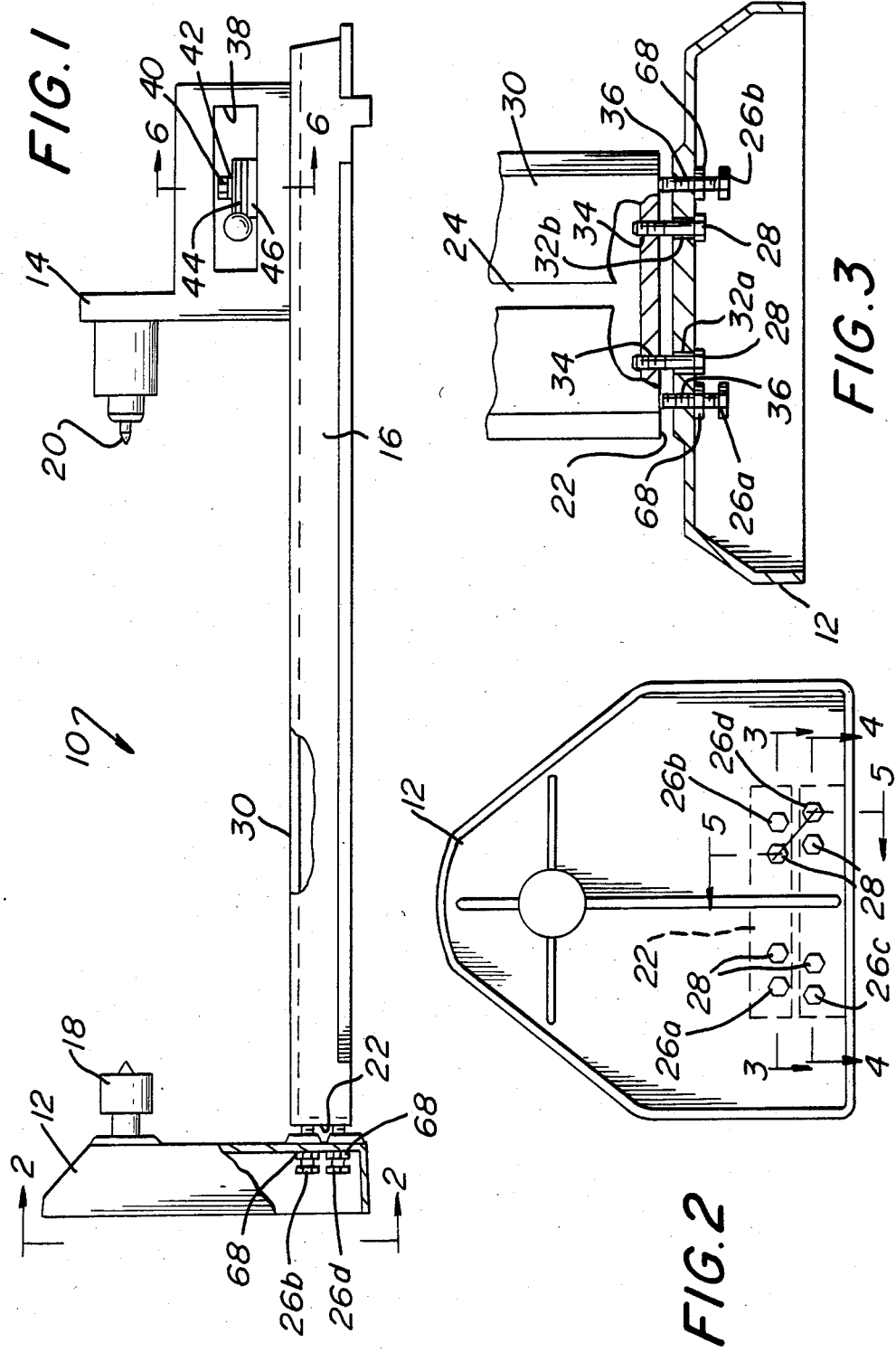

PORTABLE LATHE

BACKGROUND OF THE INVENTION

This invention is directed to a portable lathe. The portable lathe includes a removable headstock and a removable, slidable, alignable tailstock. Both are securable to a bed.

Lathes are well-known in the art. Yet, these lathes are rarely portable. They typically require substantial set up time to assure that the headstock and tailstock are perfectly aligned.

U.S. Pat. No. 1,666,484 discloses a clamping mechanism for machine tools. U.S. Pat. No. 2,243,588 discloses a lathe tail stock adjusting means. U.S. Pat. No. 2,391,154 discloses improvements to lathe tailstocks.

SUMMARY OF THE INVENTION

The present invention is directed to a portable lathe. The lathe comprises a bed, a removable headstock and a removable slidable, alignable tailstock. The bed has a horizontal plane surface. The horizontal surface includes a longitudinal guide way. The guide way extends into the bed and through the horizontal surface. A vertical plane surface is disposed at one end of the bed. The vertical plane surface has a plurality of holes therethrough.

The headstock is adapted to be removably attached to the bed. A plurality of unthreaded holes are horizontally disposed through the headstock. A plurality of threaded holes are also horizontally disposed through the headstock. The unthreaded holes are equal in number to and aligned with the holes through the vertical plane surface of the bed. Adjustable headstock alignment means are associated with the bed and the headstock. The headstock alignment means allows the headstock to be perfectly aligned with the bed. Additionally, the headstock alignment means secures the headstock to the bed.

The tailstock is adapted to be removable from and slidable on the bed and alignable with the headstock. The tailstock includes locking means for fixedly securing the tailstock to the bed. Alignment means for placing the tailstock in alignment with the headstock is located within the guide way of the bed.

A primary object of this invention is to provide a lathe which is more portable.

A further object of this invention is to provide a lathe having a removable headstock and tailstock.

A still further object of this invention is to provide a lathe which may be quickly assembled or disassembled.

Another object of this invention is to provide a lathe in which the headstock bed and tailstock may be quickly aligned with one another when machined separately.

DETAILED DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is an elevational view of a portable lathe, parts being broken away for clarity.

FIG. 2 is an enlarged elevational view of the lathe taken along lines 2—2 of FIG. 1.

FIG. 3 is an enlarged sectional view of the lathe taken long lines 3—3 of FIG. 2, parts being broken away for clarity.

DETAILED DESCRIPTION OF THE INVENTION

Figure 4:
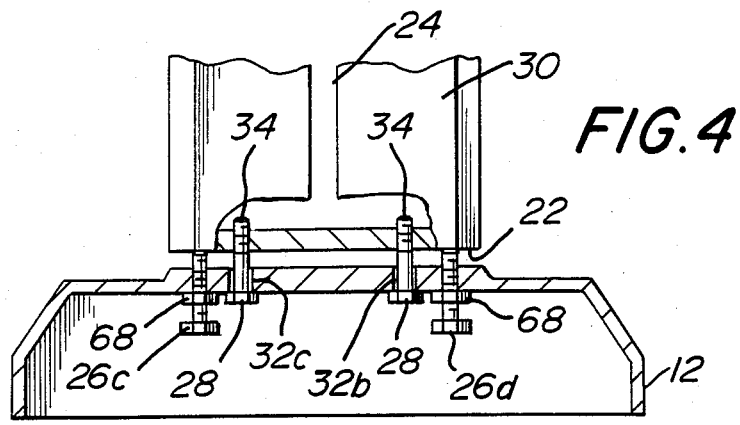
FIG. 4 is an enlarged sectional view of the lathe taken along lines 4—4 of FIG. 2, parts being broken away for clarity.
Figure 5:
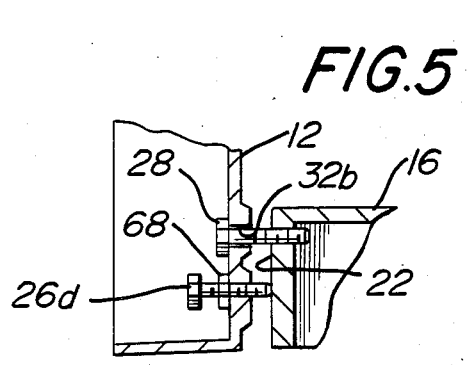
FIG. 5 is an enlarged sectional view of the lathe taken along lines 5—5 of FIG. 2, parts being broken away for clarity.

Referring to the drawings wherein like numerals indicate like elements, there is shown in FIG. 1 a portable lathe 10. Portable lathe 10 generally comprises a bed 16, a removable headstock 12, and a removable, slidable, alignable tailstock 14.

Figure 6:
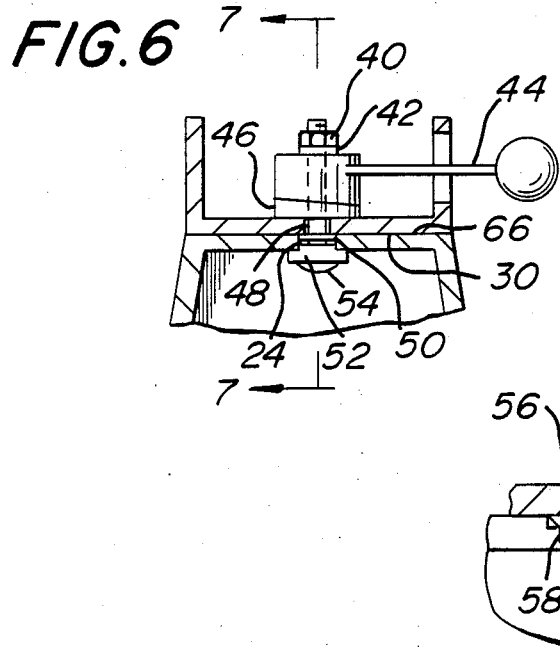
FIG. 6 is an enlarged sectional view taken along lines 6—6 of FIG. 1, parts being broken away for clarity.

Bed 16 has a horizontal plane surface 30. A guide way 24 is centrally located and longitudinally disposed along surface 30 of the the bed 16. Guide way 24 extends into bed 16 through surface 30. The guide way 24 is a slot which longitudinally bisects surface 30. See FIGS. 3 and 6. One end of bed 16 terminates in a vertical plane surface 22 which faces headstock 12. See FIGS. 1 and 2. The opposite end of bed 16 terminates in an end wall through which guide way 24 extends. A plurality of internally threaded holes 34 are horizontally disposed through the vertical surface 22. A hole 34 is located in each quadrant of vertical surface 22. Although four holes 34 are shown (see FIG. 2) any number of holes could be used. Holes 34 are described as threaded, but they could also be nonthreaded holes as will be described in greater detail later.

Headstock 12 has a spindle 18. Spindle 18 is for engaging a workpiece to be rotated by the lathe. The mechanism for rotating the spindle 18 is not a part of this invention and is well-known in the art. Spindle 18 is located in an upper vertical portion of the headstock and is located above bed 16. Spindle 18 is perpendicular to the upper vertical portion of the headstock.

The headstock 12 includes a plurality of unthreaded holes 32 horizontally disposed therethrough. A plurality of threaded holes 36 are likewise horizontally disposed through the headstock. The holes 32 and holes 36 are located in a lower vertical portion of the headstock 12. The lower vertical portion is located below spindle 18 and faces the vertical surface 22. A hole 36 is horizontally adjacent each hole 32. Holes 32a and 32b are set on the same horizontal plane. Holes 32c and 32d are set on the same horizontal plane. Holes 32c and 32d are located below holes 32a and 32b. Holes 32c and 32d are set further apart than holes 32a and 32b. The holes 32 are equal in number with and coaxially aligned with the slots 34 of the bed 16.

A push bolt 26 is threadingly engaged in each of the threaded holes 36 of the headstock 12. A jam nut 68 is threadingly engaged on each bolt 26 between the head of bolt 26 and hole 36. The free ends of the push bolts 26 are adapted for bearing engagement with the vertical surface 22 of the bed.

A pull bolt 28 is adapted to pass through each of the unthreaded holes 32 of the headstock 12 and threadingly engage the corresponding threaded hole 34 of the bed. Alternatively, holes 34 can be unthreaded. In this case, a pull bolt 28 would pass through both hole 32 and hole 34. The free end of pull bolt 28 would extend out of hole 34, and a nut (or nut and washer) would be secured thereon. The nut (not shown), when tightened on bolt 32, would pull vertical surface 22 toward headstock 12.

The push bolts 26, which threadingly engage the headstock and are placed in bearing engagement with the vertical surface 22, are for adjusting the alignment between the headstock 12 and the bed 16. Alignment between the headstock 12 and the bed 16 means that the axis of the spindle 18 is parallel to the axis of the bed 16. By adjusting various push bolts 26 (after loosening jam nuts 68), one is able to put headstock 12 in perfect alignment with bed 16. For example, by turning the two upper push bolts 26 (a & b), so to move the bolts 26 (a & b) in or out of their respective holes 36, the headstock can be tilted from top to bottom. By turning two side push bolts 26 (b & d or a & c), the headstock can be twisted from side to side. It is necessary that the headstock 12 be at a 90° angle, both in the vertical and horizontal direction, with the axis of the bed 16.

The pull bolts 28 are used to secure the headstock 12 to the bed 16. Once the push bolts 26 have been adjusted to bring the headstock 12 into alignment with the bed 16 (and jam nuts 68 placed in bearing engagement headstock 12), the pull bolts 28 are engaged with their respective holes 34 of the bed 16 and tightened. Thus, the headstock 12 is aligned with the bed and rigidly secured thereto.

Although four push bolts 26 and four pull bolts 28 are shown in the drawings, it will be understood that any number of push bolts and pull bolts would be sufficient. Of course, it would require at least three of each type of bolt to secure and maintain the headstock 12 in perfect alignment with bed 16.

Tailstock 14 has a main body which is U-shaped in cross section. See FIG. 6. An end of the main body is defined by a vertical wall. The wall extends above the main body. A live center point 20 is secured to the vertical end wall above the main body and on the side opposite of the vertical wall from the main body. The live center 20 point is perpendicular to the vertical wall and is for engaging the work piece held by spindle 18. The live center point 20 is spaced above the horizontal surface 30 and the axis of the live center point is parallel to the horizontal surface 30.

The main body of the tailstock 14 is further defined by a pair of side walls and a base, i.e., U-shaped in crosssection. An opening 38 is disposed through one of the side walls and is rectangular. Located within the main body is a nut 40 threadingly engaged on a bolt 54. Bolt 54 is adapted for securing a locking means and a tailstock alignment means to the tail stock 14. Bolt 54 extends into tailstock 14 from an aperture 48 in the base of tailstock 14. Below nut 40 and surrounding bolt 54 is a washer 42.

The structure and operation of the tailstock locking means and alignment means is described as follows.

Figure 7:
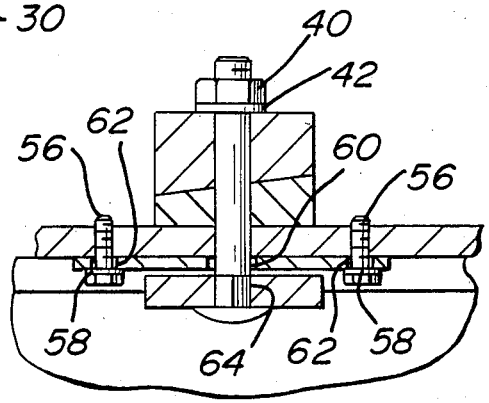
FIG. 7 is an enlarged sectional view taken along lines 7—7 of FIG. 6, parts being broken away for clarity.

Cam lock arm 44 includes an arm portion which extends out of opening 38 and a sleeve portion which surrounds bolt 54. A cam lock arm 44 is in face contact with washer 42. The sleeve portion of arm 44 has an underside which is inclined. A cam lock wedge 46 is located below the sleeve portion of cam lock arm 44 and surrounds bolt 54. The cam wedge 46 has an upper surface which is inclined. The inclined surfaces of the arm 44 and wedge 46 are in face contact when placed on bolt 54. Cam lock wedge 46 rests on the base of tailstock 14. Below the tailstock base and located within guide way 24 is guide bar 50. Below guide bar 50 is lock plate 52. Lock plate 52 is generally an inverted T-shape member. The shank portion of lock plate 52 is slightly smaller than the guide way 24, so that lock plate 52 will not impede the sliding movement of tailstock 14. Lock plate 52 has a centrally disposed square aperture 64. Square aperture 64 engages a squared portion of bolt 54. Square aperture 64 and the square portion of bolt 54 prevent bolt 54 from being rotated. Bolt 54 extends through both guide bar 50 and lock plate 52. See FIGS. 6 and 7.

Guide bar 50 is secured in fact contact with the bottom surface 66 of tailstock 14. Guide bar 50 is an oblong member having rounded ends. The width of guide bar 50 is only slightly less than the width of guide way 24. This allows guide bar 50 to be freely slidable within guide way 24. Guide bar 50 is secured to the tailstock 14 by means of two screws 56. Screws 56 extend through end holes 62 located in the end portions of guide bar 50. A lock washer 58 is cisposed between the head of screw 56 and guide bar 50. End holes 62 are slightly larger than the diameter of screws 56. This allows the tailstock to be adjusted when aligning it with the headstock. A center hole 60 is located equidistant between end holes 62. Bolt 54 extends through center hole 60.

To align tailstock 14 with headstock 12, the guide bar 50 is attached to the underside 66 of the tailstock 14 with the two screws 56. The two screws 56 are snug enough to hold the guide bar 50 firmly in place but are not completely tightened. The tailstock 14 with guide bar 50 attached to the underside of the tailstock is placed on surface 30 of bed 16, so that guide bar 50 occupies guide way 24. The tailstock 14 is moved forward on bed 16 toward headstock 12 until spindle 18 and center point 20 just contact each other. The spindle 18 and point 20 are then aligned by shifting the tailstock while screws 56 are loose until the spindle 18 and center point 20 become perfectly aligned (i.e., spindle 18 and center point 20 are coaxial). The tailstock 14 is carefully removed from the bed 16 and the screws 56 are further tightened so that guide bar 50 is secured into position. The tailstock 14 is placed back onto the bed 16 to make certain that the guide bar 50 has not moved during the tightening process. The tailstock 14 is removed from the bed and the locking means is assembled within the tailstock 14 as follows.

The lock plate 52 is placed on the bolt 54 with the lock plate shank up. The bolt 54, with the lock plate 52 in place, is placed through center hole 60 of the guide bar 50 and aperture 48 of the tailstock. The cam lock wedge 46 which has a center hole is placed on the bolt 54 and rests on the base of the tailstock. The cam lock arm 44 is placed through the opening 38 onto the bolt 54. The flat washer 42 is placed on top of the arm 44 and the lock nut 40 threaded onto the bolt 54 making the entire assembly captive. The tailstock 14 is slid onto the bed 16.

The locking mechanism (bolt 54, lock plate 52, arm 44, wedge 46 and nut 40) is operated by tightening or loosening the lock nut 40 until the tailstock 14 slides freely along the bed 16. The lock nut 40 is not tightened so to fix the tailstock 14 to the bed 16. The tailstock 14 is fixed to bed 16 by shifting arm 44 to the right or left. When the arm 44 is shifted to the right, the tailstock can be slid along bed 16. Shifting arm 44 to the left firmly locks the tailstock to the bed 16. The tailstock 14 can be removed and replaced at any time simply by removing the arm 44 to the right and sliding the tailstock until it clears the bed.

The present invention may be embodied in other specific forms without departing from the spirit or essential attributes thereof and, accordingly, reference should be made to the appended claims, rather than to the foregoing specification, as indicating the scope of the invention.

We claim:

1. A portable lathe comprising:
   a bed having horizontal plane surface and a longitudinal guide way disposed therethrough;
   a headstock removably attached to one end of the bed;
   means for aligning the headstock to the bed;
   a removable tailstock slidably disposed in the guide way and alignable with the headstock;
   means for aligning said tailstock with the headstock comprising a guide bar associated with the base of said tailstock which freely slides in said guide way, said guide bar having a hole, at each end and a center hole located between said end hole; and a screw associated with each end hole, the diameter of the screw being less than the diameter of said end holes, said screw being for engagement with a base of said tailstock; and
   means for selectively locking the tailstock into position on the bed.

2. The portable lathe according to claim 1 wherein said means for aligning the headstock comprises:
   a vertical plane surface at one end of said bed, said vertical surface having a plurality of holes horizontally disposed therethrough;
   a vertical portion of said headstock facing said bed vertical surface, said vertical portion having a plurality of first holes and a plurality of second holes horizontally disposed therethrough, each first hole being adjacent to a second hole, said first holes being equal in number and aligned with said bed holes;
   a push means engaged in each of said second holes, said push means having a free end adapted for bearing engagement with said vertical surface; and
   a pull means associated with each of said second holes, said pull means adapted to pass through said second holes and said bed holes.

3. The portable lathe according to claim 1 wherein said means for selectively locking the tailstock comprises:
   a bolt vertically disposed through an aperture in the base of said tailstock;
   a lock plate being an inverted T-shape member the shank of which is slidable within said guide way, said lock plate being disposed on said bolt below the base of said tailstock;
   a cam wedge disposed on said bolt above the base of said tailstock; and
   a cam lock arm disposed on said bolt above said cam wedge, said arm being movable between a first and second position, said first position locking said tailstock in place on said bed, said second position allowing said tailstock to be freely slidable on said bed.

4. A portable lathe comprising:
   a bed having a horizontal plane surface, said horizontal surface having a centrally located longitudinal guide way disposed therethrough, said bed having a vertical plane surface disposed at an end of said bed, said vertical surface having a plurality of bed holes horizontally disposed therethrough;
   a headstock adapted for removable attachment to said bed, a plurality of first headstock holes horizontally disposed therethrough, and a plurality of second headstock holes horizontally disposed therethrough, said plurality of first headstock holes being equal in number and aligned with said bed holes, a first headstock hole being adjacent each second headstock hole;
   adjustable headstock alignment means being associated with said bed holes and first headstock holes and said second headstock holes, said alignment means further comprises a guide bar associated with a base of said tailstock, said guide bar having an oblong member which freely slides in said guide way, said guide bar having two end holes and a center hole located between said end hole, and a screw associated with each end hole, the diameter of the screw being less than the diameter of said end holes, said screw being for engagement with a base of said tailstock; and
   a tailstock adapted for removable, slidable, fixable attachment to said bed, said tailstock including locking means for fixably securing said tailstock to said bed, and tailstock alignment means for fixing said tailstock in alignment with said headstock, said tailstock alignment means being located within said guide way.

5. The portable lathe according to claim 4 wherein said adjustable head stock alignment means comprises:
   a plurality of push bolts, a push bolt being engaged in each of said headstock holes, said push bolts having a free end adapted for bearing engagement with said vertical surface; and
   a plurality of pull bolts, a pull bolt adapted to pass through each of said first headstock holes and said bed holes.

6. The portable lathe according to claim 4 wherein said locking means comprises:
   a bolt vertically disposed through an aperture in a base of said tailstock;
   a lock plate being an inverted T-shape member, a shank of said lock plate being slidable within said guide way, said lock plate being disposed on said bolt below the base of said tailstock;
   a cam wedge disposed on said bolt above the base of said tailstock;
   a cam lock arm disposed on said bolt above said cam wedge, said arm being movable between a first and second position, said first position locking said tailstock in place on said bed, said second position allowing said tailstock to be freely slidable on said bed; and
   a nut threadingly engaged on said bolt above said arm.

7. The portable lathe according to claim 4 wherein said bed holes number at least three.

8. The portable lathe according to claim 4 wherein said bed holes are threaded.

9. A portable lathe comprising:
   a bed having a horizontal plane surface, said horizontal surface having a centrally located longitudinal guide way disposed therethrough, said bed having a vertical plane surface disposed at an end of said bed, said vertical surface having a plurality of bed holes horizontally disposed therethrough;

a headstock adapted for removable attachment to said bed, a plurality of first headstock holes horizontally disposed therethrough, and a plurality of second headstock holes horizontally disposed therethrough, said plurality of first headstock holes being equal in number and aligned with said bed holes, a edit headstock hole being adjacent each second headstock hole;

adjustable headstock alignment means being associated with said bed holes and first headstock holes, said adjustable headstock alignment means comprises a plurality of push bolts, a push bolt being engaged in each of said second headstock holes, said push bolts having a free end adapted for bearing engagement with said vertical surface, a plurality of pull bolts, a pull bolt adapted to pass through each of said first headstock holes and said bed holes; and a tailstock adapted for removable, slidable, fixable attachment to said bed, said tailstock including locking means for fixedly securing said tailstock to said bed, said locking means comprises a bolt vertically disposed through an aperture in a base of said tailstock, a lock plate being an inverted T-shape member, a shank of said lock plate being slidable within said guide way, said lock plate being disposed on said bolt below the base of said tailstock, a cam wedge disposed on said bolt above the base of said tailstock, a cam lock arm disposed on said bolt above said cam wedge, said arm being movable between a first and second position, said first position locking said tailstock in place on said bed, said second position allowing said tailstock to be freely slidable on said bed, a nut threadingly engaged on said bolt above said arm, and tailstock alignment means for fixing said tailstock in alignment with said headstock, said tailstock alignment means being located within said guide way, said tailstock alignment means further comprises a guide bar associated with a base of said tailstock, said guide bar being an oblong member which freely slides in said guide way, said guide bar having two end holes and a center hole located between said end holes, and a screw associated with each end hole, the diameter of the screw being less than the diameter of said end holes, said screw being for engagement with the base of said tailstock.

10. The portable lathe according to claim 9 wherein said bed holes number at least three.

11. The portable lathe according to claim 9 wherein said bed holes are threaded.

12. A portable lathe having a headstock comprising:
a bed having a horizontal plane surface, said horizontal surface having a centrally located longitudinal guide way disposed therethrough; and a tailstock adapted for removable, slidable, fixable attachment to said bed, said tailstock including locking means for fixedly securing said tailstock to said bed, and tailstock alignment means for fixing said tailstock in alignment with said headstock, said tailstock alignment means being located within said guide way, said tailstock alignment means further comprises a guide bar associated with a base of said tailstock, said guide bar being an oblong member which freely slides in said guide way, said guide bar having two end holes and a center hole located between said end hole, and a screw associated with each end hole, the diameter of the screw being less than the diameter of said end holes, said screw being for engagement with a base of said tailstock.

13. The portable lathe according to claim 12 wherein said locking means comprises:
a bolt vertically disposed through an aperture in a base of said tailstock;

a lock plate being an inverted T-shape member, a shank of said lock plate being slidable within said guide way, said lock plate being disposed on said bolt below the base of said tailstock;

a cam wedge disposed on said bolt above the base of said tailstock;

a cam lock arm disposed on said bolt above said cam wedge, said arm being movable between a first and second position, said first position locking said tailstock in place on said bed, said second position allowing said tailstock to be freely slidable on said bed; and a nut threadingly engaged on said bolt above said arm.

* * * * *